United States Patent
Detlefs et al.

(10) Patent No.: US 7,895,883 B2
(45) Date of Patent: Mar. 1, 2011

(54) METHOD AND SYSTEM FOR IDENTIFYING A DEFECT OR FAILURE OF A COMPRESSED AIR LOAD CIRCUIT IN AN ELECTRONIC COMPRESSED AIR INSTALLATION FOR VEHICLES

(75) Inventors: Carsten Detlefs, Ronnenberg (DE); Heinrich Diekmeyer, Barsinghausen (DE); Frank-Dietmar Lippelt, Barsinghausen (DE); Joachim Reinhardt, Hannover (DE); Bernd Strilka, Hannover (DE)

(73) Assignee: WABCO GmbH, Hannover (DE)

( * ) Notice: Subject to any disclaimer, the term of this patent is extended or adjusted under 35 U.S.C. 154(b) by 745 days.

(21) Appl. No.: 10/566,028

(22) PCT Filed: Jul. 12, 2004

(86) PCT No.: PCT/EP2004/007648
§ 371 (c)(1), (2), (4) Date: Feb. 21, 2007

(87) PCT Pub. No.: WO2005/014353
PCT Pub. Date: Feb. 17, 2005

(65) Prior Publication Data
US 2007/0262280 A1   Nov. 15, 2007

(30) Foreign Application Priority Data

Jul. 28, 2003 (DE) .................................. 103 34 318
Dec. 10, 2003 (DE) .................................. 103 57 764

(51) Int. Cl.
*G01M 3/02* (2006.01)

(52) U.S. Cl. ............................................................ 73/37
(58) Field of Classification Search ............... 73/37, 1.16
See application file for complete search history.

(56) References Cited

U.S. PATENT DOCUMENTS

| 4,218,882 A | 8/1980 | Farr |
| 4,484,784 A | 11/1984 | Leiber |
| 6,089,831 A | 7/2000 | Bruehmann et al. |
| 6,205,798 B1 * | 3/2001 | Porter et al. ..................... 62/129 |
| 6,276,761 B1 | 8/2001 | Beck |
| 6,367,887 B1 | 4/2002 | Sulzyc |

FOREIGN PATENT DOCUMENTS

DE    28 21 393 A1    11/1978

(Continued)

OTHER PUBLICATIONS

EU Directive 98/12; Jan. 27, 1998.

*Primary Examiner* — Hezron Williams
*Assistant Examiner* — Alex Devito
(74) *Attorney, Agent, or Firm* — Kramer Levin Naftalis & Frankel LLP

(57) ABSTRACT

To detect a defect or failure of a compressed air load circuit in a compressed air system for vehicles, pressure is measured in compressed air load circuits and evaluated in an electronic control unit, which briefly shuts off the compressed air load circuits, measures pressure values and/or determines pressure gradients during the shutoff time and compares the pressure values and/or the determined pressure gradients with a respective threshold value, identifies defective circuits and definitively shuts off circuits detected as defective if the results are below the threshold value.

14 Claims, 3 Drawing Sheets

FOREIGN PATENT DOCUMENTS

| | | |
|---|---|---|
| DE | 29 50 904 C2 | 6/1981 |
| DE | 34 35 089 A1 | 4/1986 |
| DE | 41 09 741 C1 | 3/1992 |
| DE | 40 30 361 A1 | 4/1992 |
| DE | 195 15 895 A1 | 10/1996 |
| DE | 196 22 095 A1 | 12/1997 |
| DE | 198 11 305 A1 | 9/1999 |
| DE | 199 28 113 C1 | 10/2000 |
| DE | 694 26 513 T2 | 2/2001 |
| DE | 199 39 529 A1 | 4/2001 |
| DE | 100 04 091 A1 | 8/2001 |
| DE | 100 29 125 A1 | 1/2002 |
| DE | 101 42 791 A1 | 3/2003 |
| EP | 0 477 519 A1 | 4/1992 |
| EP | 0 810 136 A1 | 12/1997 |
| EP | 0 810 136 B1 | 12/1997 |
| EP | 1 004 495 B1 | 5/2000 |
| EP | 1 122 140 A1 | 8/2001 |
| WO | WO 96/34785 | 11/1996 |
| WO | WO 98/47751 | 10/1998 |

* cited by examiner

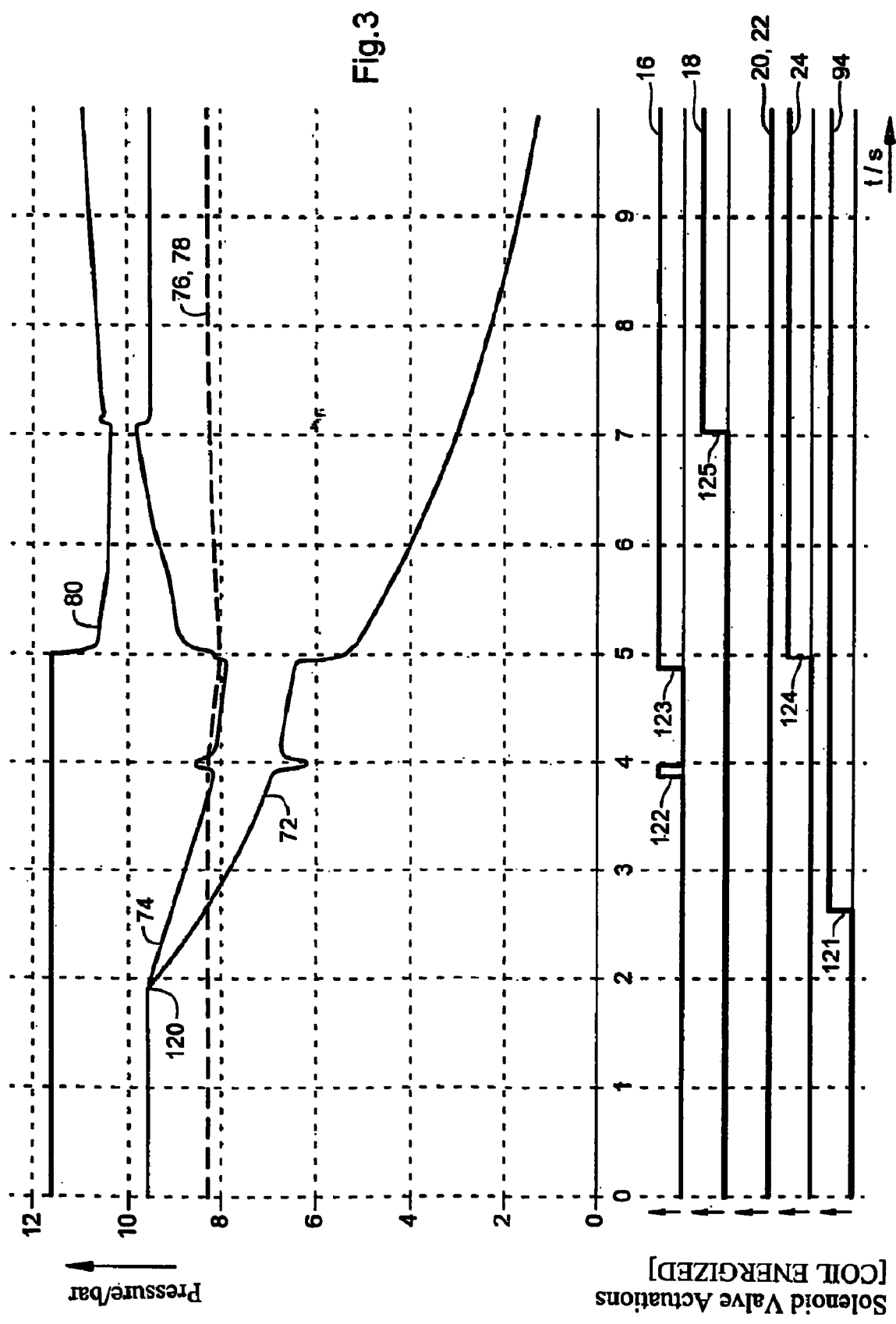

METHOD AND SYSTEM FOR IDENTIFYING A DEFECT OR FAILURE OF A COMPRESSED AIR LOAD CIRCUIT IN AN ELECTRONIC COMPRESSED AIR INSTALLATION FOR VEHICLES

BACKGROUND OF THE INVENTION

The present invention relates to a method and system for detecting a defect or failure of a compressed air load circuit in an electronic compressed air system for vehicles.

Conventional multi-circuit protective valves divide energy supply into several mutually independent load circuits and, in the event of failure of one load circuit, for example by line rupture, maintain a minimum pressure in the intact circuits. If a defect allowing more air to be lost than can be resupplied by the compressor occurs in a service-brake circuit, the pressure in the service-brake circuit drops until the pressure reaches the closing pressure of the valve. The pressure in the defective circuit continues to drop, whereas the closing pressure is maintained in the intact circuit. While the pressure in the defective circuit continues to drop, the circuit that is still intact can be refilled by the compressor until the opening pressure of the defective circuit is reached. There is established a dynamic equilibrium, in which the delivered compressed air can supply the circuits that are still intact (as well as secondary load circuits), although at the same time air is being lost via the defect. A disadvantage of conventional multi-circuit protective valves is that the maximum pressure in the brake system is equal to the opening pressure of the defective circuit when it breaks. Another disadvantage is that the pressure momentarily drops to the closing pressure of the defective circuit. Yet another disadvantage in particular is the relatively large energy loss in the event of a circuit failure, because defective circuits are detected and shut off at a relatively late stage.

SUMMARY OF THE INVENTION

Generally speaking, in connection with the present invention, a method and system are provided which overcome the disadvantages associated with conventional methods and systems and which provide the capability to detect a defect or failure of a compressed air load circuit at an early stage and to shut off such defective or failed circuit at an early stage, minimizing energy loss. It will be appreciated that vehicle safety is substantially increased.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangements of parts which are adapted to effect such steps, all as exemplified in the construction herein set forth, and the scope of the invention will be indicated in the claims.

BRIEF DESCRIPTION OF THE DRAWINGS

The present invention will be described in more detail hereinafter on the basis of the accompanying drawings, in which:

FIGS. 2 and 3 are graphical representations illustrating aspects of a method for detecting the defect or failure of a load circuit according to preferred embodiments of the present invention.

DETAILED DESCRIPTION OF THE PREFERRED EMBODIMENTS

Figure 1:
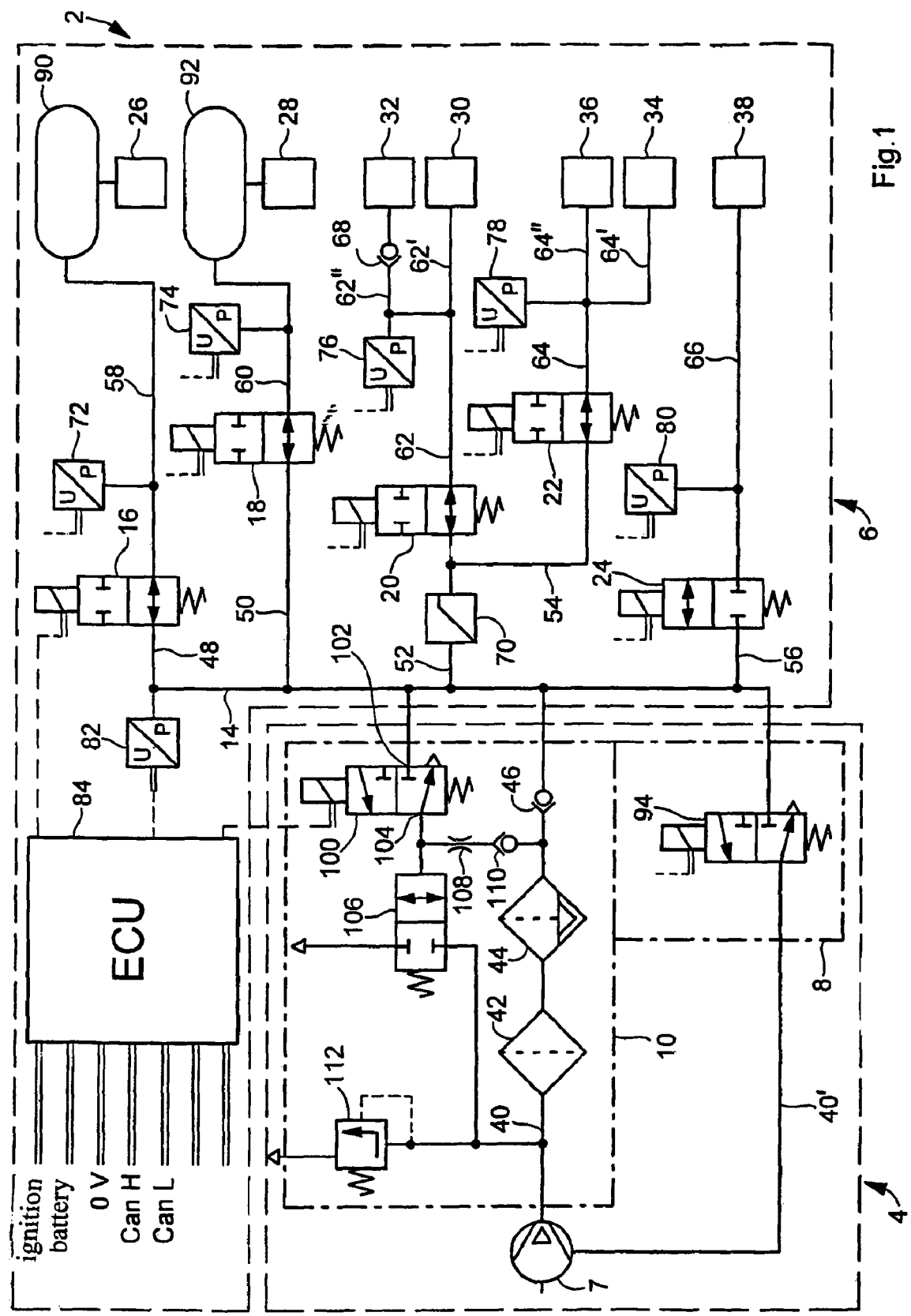
FIG. 1 shows a compressed air system according to a preferred embodiment of the present invention.

Referring now to FIG. 1, where pressurized-fluid lines are represented by solid lines and electrical lines by broken lines, there is shown a compressed air system 2 with a compressed air supply part 4 and a consumer part 6. Compressed air supply part 4 comprises a compressor 7, a compressor control device 8 and an air-dryer part 10.

Consumer part 6 is provided with a compressed air distributor line 14, a plurality of electrically actuatable valves, preferably solenoid valves 16, 18, 20, 22, 24 with restoring springs and a plurality of load circuits 26, 28, 30, 32, 34, 36, 38 supplied with compressed air via the solenoid valves.

From compressor 7, a compressed air supply line 40 leads via a filter 42, an air dryer 44 and a check valve 46 to distributor line 14, from which there are branched off lines 48, 50, 52, 54, 56 leading to the solenoid valves. From the solenoid valves, compressed air lines 58, 60, 62, 64, 66 lead to the load circuits. Line 62 splits into lines 62' and 62" leading to circuits 30 and 32, a check valve 68 also being disposed in line 62". A pressure limiter 70 is disposed in supply line 52. Line 54, which leads to solenoid valve 22, branches off downstream from pressure limiter 70. Line 64 splits into lines 64' and 64" leading to circuits 34 and 36.

Pressure sensors 72, 74, 76, 78, 80, 82 monitor the pressure in the consumer loops and in distributor line 14, and transmit the respective pressure as a pressure signal to electronic control unit 84, which controls the solenoid valves.

Load circuits 26, 28 can be, for example, service-brake circuits. Load circuit 30 can be a trailer-brake circuit, in which case normally two lines, a supply line and a brake line, lead to the trailer. Load circuit 32 can be a parking-brake circuit with spring accumulator. Load circuits 34 and 36 can be secondary load circuits, such as operator's cab suspension, door controller, etc., in other words, all components that have nothing to do with the brake circuits. Load circuit 38 can be a high-pressure circuit.

Service-brake circuits 26, 28 are provided with compressed air reservoirs 90, 92 in conformity with EU Directive 98/12.

The inventive compressed air system makes it possible to dispense with compressed air reservoirs in circuits 30, 32, 34, 36 and particularly in air-suspension circuit 38. As an example, it is permissible to supply other load circuits from the service-brake circuits (circuits 26 and 28), provided the braking function or braking action of service-brake circuits 26 and 28 is not impaired.

Via a line 40', compressor 7 is mechanically (pneumatically) controlled by compressor controller 8. Compressor controller 8 comprises a solenoid valve 94 of small nominal width that can be switched by electronic control unit 84. In the de-energized normal state it is vented, as illustrated, whereby compressor 7 is turned on. If compressor 7 is to be turned off, for example because all load circuits are filled with compressed air, control unit 84 changes over solenoid valve 94 so that the pressure-actuatable compressor is turned off via line 40'. If solenoid valve 94 is switched to de-energized condition, for example because a load circuit needs compressed air, solenoid valve 94 is again switched to the normal state illustrated in FIG. 1, whereby line 40' is vented and in this way compressor 7 is turned on.

Air-dryer part 10 comprises a solenoid valve 100 with small nominal width, whose inlet 102 is in communication with distributor line 14 and whose outlet 104 is in communication with a shutoff valve 106, which, in turn, is in communication with supply line 40 of compressor 7 and serves for venting of the air dryer.

When solenoid valve 100 is switched to passing condition, compressor 7 no longer discharges into the load circuits but instead discharges via valve 106 to the atmosphere. At the same time, dry air flows from distributor line 14 (out of reservoirs 90, 92 of the service-brake circuits) via solenoid valve 100, throttle 108 and a check valve 110 through air dryer 44 for regeneration of its desiccant and further via filter 42 and valve 106 to the atmosphere.

Reference numeral 112 denotes an overpressure valve.

Solenoid valves 16, 18, 20, 22, 24 are controlled by control unit 84, solenoid valves 16 to 22 of load circuits 26 to 34 being open in de-energized normal state, while solenoid valve 24 of the high-pressure circuit is closed in de-energized normal state. Pilot-controlled solenoid valves can also be used. The pressure in the circuits is directly monitored at the solenoid valves by pressure sensors 72, 74, 76, 78, 80.

If the pressure were to drop in a load circuit, for example in circuit 30 (trailer-brake circuit), the compressed air supply also takes place by service-brake circuits 26 and 28, the pressure in secondary load circuits 30 to 36 being adjusted by pressure limiter 70 to a lower level, such as 8.5 bar, than the pressure level of, for example, 10.5 bar in the service-brake circuit (see hereinafter). High-pressure circuit 38 is shut off and therefore is not in communication with the other circuits. The high-pressure circuit usually has a higher pressure than the other load circuits, such as 12.5 bar.

Figure 2:
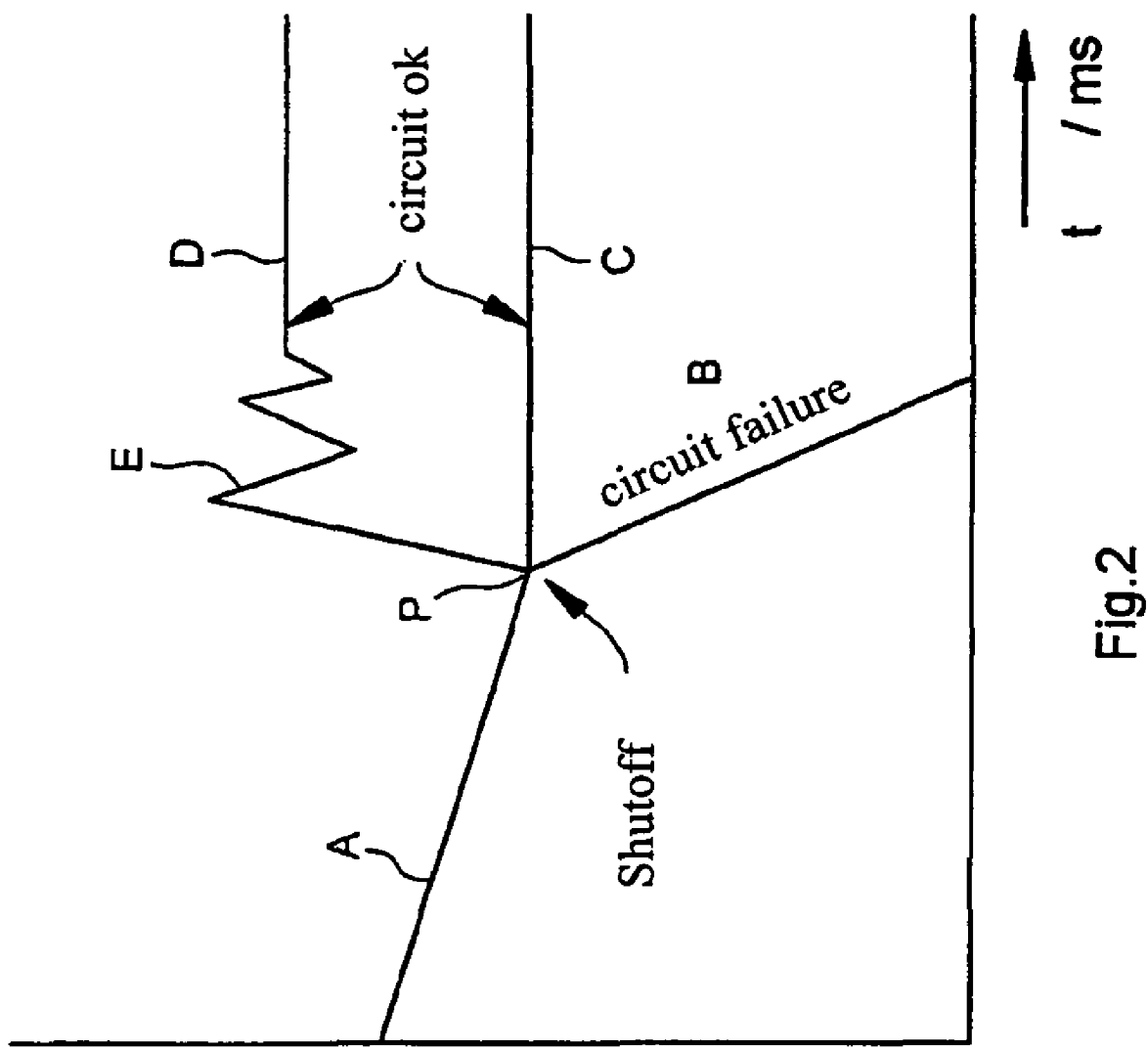

The inventive method will now be explained in more detail on the basis of FIGS. 2 and 3.

As explained above, the pressure in a load circuit 26 to 38 can be measured by pressure sensors 72 to 80. Because of the location of these pressure sensors shown in FIG. 1, however, such a pressure sensor does not directly measure the pressure in the respective load circuit. Instead it measures the pressure at the inlet of pressure-supply line 58 to 66 to the load circuit, or in other words at the outlet of the respective associated solenoid valve 16 to 24.

The pressure recorded by a pressure sensor 72 to 80 is therefore equal to the pressure in associated load circuit 26 to 38 itself only in the pressure-equalized condition. Otherwise, it is different, when repressurization via a pressure line 48 to 66 is taking place because of compressed air consumption in the circuit and supply air is flowing through the pressure line. A dynamic pressure difference, by which the pressure in the circuit is lower than the pressure measured at the solenoid valve, develops across the pressure line. This pressure loss is greatest during a failure of the load circuit (for example, due to a line break), namely when, because of the break, atmospheric pressure is present at the port of pressure-supply line 58 to 64 directed toward the circuit, and the pressure in connecting line 14, measured at the pressure-sensor measurement point, is reduced by the pressure drop at the solenoid valve.

Because of the very high air flows in the case of such a break (on the order of magnitude of 5000 l/m), the pneumatically coupled pressure chambers are also vented, meaning that the pressure in connecting line 14, for example, also drops sharply.

In a state characterized by such powerful venting flows, a reliable overall state that permits unambiguous detection of the failed compressed air circuit can be reconstructed only with difficulty from the measured values of pressure sensors 72 to 80 themselves.

According to a preferred embodiment of the present invention, the defective compressed air load circuit can be detected by determining how the venting flow affects a circuit when venting is momentarily turned off. Only in the defective circuit does the pressure continue to drop, while in all other circuits either no influence is detectable or a pressure rise occurs, because, as a result of the lack of venting via the defective circuit, the pressure can be raised again by the air present in the compressed air reservoirs. This is schematically illustrated in FIG. 2.

In load circuits in which the pressure drops due to a defect or due to brake actuation (see line A in FIG. 2) and goes below a pressure threshold, such as point P, or in which the negative pressure gradient (pressure drop versus time) decreases below a threshold value, normally open solenoid valves or all such valves are momentarily shut off by electronic control unit 84 and the pressure variation after shutoff is tracked by the control unit. If the pressure continues to drop despite shutoff, as indicated by line B, this is an indication of a genuine defect, for example due to line rupture or line break, which is detected by electronic control unit 84 on the basis of the pressure signals of the pressure sensors. The control unit then turns off the solenoid valve associated with the defective load circuit and thereby shuts off the defective circuit as a whole, so that the intact circuits can continue to operate properly without being influenced by defective circuits.

If the pressure in the shut-off circuit does not change after shutoff instant P (line C), as is the case for an intact circuit without compressed air reservoir, or if the pressure even rises to a higher value than at instant P (line D), as is the case for an intact circuit with compressed air reservoir, although pressure fluctuations E can still occur at first, this is an indication of an intact circuit. In this case, no measures are taken by control unit 84.

Pressures below the threshold values can also be caused by dynamic pressure surges in the air-suspension system or by other dynamic pressure overshoots or dynamic pressure changes in the load circuits, and can be interpreted as defects by control unit 84 even though they do not represent actual defects. To ensure that load circuits will not be shut off in such cases that are erroneously detected as defective circuits, it is provided according to an advantageous embodiment of the present invention that momentary shutoff will be applied several times in succession, in pulsed manner, so to speak, and that each momentary shutoff will be followed by a brief observation time, such as 0.4 sec. Only if the pressure has dropped further after several pulsed shutoffs have been applied will the corresponding load circuit be definitively shut off. The definitively shut-off load circuit will continue to be monitored thereafter to determine whether it is actually not defective or no longer defective.

An example of detection of failure of brake circuit 26 will now be explained in more detail on the basis of FIG. 3.

With failure of brake circuit 26 due to line break at instant 120 according to FIG. 3, the pressure value measured by pressure sensor 72 drops very rapidly. As a consequence, and as already explained, the pressure in brake circuit 28 (see curve 74 in FIG. 3), which is in pneumatic communication, and in connecting line 14 also drops rapidly (not illustrated in FIG. 3). The pressure drop in connecting line 14 has the consequence that solenoid valve 94, which turns on the compressor, is actuated at instant 121. By virtue of the now detected pressure drop in circuit 26, a test pulse of 0.2 seconds, for example, is transmitted to the control input of solenoid valve 16 at instant 122, thus blocking the solenoid valve for this time interval. Solenoid valve 16 is selected, since a line break is to be suspected there first because of the greater pressure drop than in circuit 28.

As a consequence of this blockage, the pressure at pressure sensor 74 in unaffected brake circuit 28 rises momentarily, because compressed air reservoir 92 can supply air to intact circuit 28 once again when venting is interrupted by defective circuit 26. With respect to defective circuit 26, however, a faster pressure drop takes place at pressure sensor 72 during the time of valve blockage because repressurization by the intact circuits is interrupted. The pressure at pressure sensors 76, 78 of circuits 30, 36 is unchanged during the test pulse. The pressure in these circuits undergoes little change in any case during the entire venting operation, because pressure limiter 70 ensures that the pressure sensors will be decoupled from distribution line 14. Because the pressure drops more rapidly only in circuit 26 during the test pulse, the suspicion that this circuit is defective is strengthened. In order to be certain whether this conclusion is correct, this testing can be repeated by turning off valve 16 several times in pulsed manner. In the practical example, this is done a second and last time at instant 123. The pressure again drops more rapidly in circuit 26, and it is now definitively established that circuit 26 is the defective circuit, after which it is kept permanently blocked.

To resupply intact brake circuit 28 with air, solenoid valve 24 of high-pressure circuit 38 is switched to open condition at instant 124, so that intact circuit 28 and if necessary circuits 30 and 36, which are in pneumatic communication therewith and are also intact, can be rapidly resupplied with air. To ensure that resupply with air can be achieved in the desired manner, high-pressure circuit 38 is provided with a compressed air reservoir (not illustrated). The pressure drop in the high-pressure circuit during this rapid resupply with air can be detected at pressure sensor 80, as shown by the drop at instant 124. After resupply with air has been achieved, circuit 28 is shut off for a certain time, beginning at instant 125. During this time, the high-pressure circuit is refilled via the compressor, which is running. On completion of this refilling (no longer illustrated in FIG. 3), the control signals for solenoid valves 94 and 18 are reset once again.

Instead of test shutoff of the solenoid valve of the supposedly defective circuit with the rapid pressure drop in the manner explained, it is also possible to shut off several other or even all solenoid valves. A similar pressure variation is then obtained, specifically because each blockage of this type is capable of preventing repressurization of the defective circuit via connecting line 14.

As an alternative to the pressure, it is also possible to monitor other variables of state, such as air flow rate, air mass and energy, in the compressed air load circuits.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for detecting defective or failed compressed air load circuits in a vehicle compressed air system, in which pressure in lines to said compressed air load circuits is continuously monitored, said method comprising the steps of:
   momentarily shutting off said compressed air load circuits;
   while said compressed air load circuits are momentarily shut off, (i) at least one of measuring values and determining gradients of a variable of state in said compressed air system; (ii) comparing at least one of said values and gradients with a predefined respective threshold value; and (iii) identifying at least one of defective and failed ones of said compressed air load circuits when one of said values and gradients is below said predefined respective threshold value; and
   shutting off said at least one of defective and failed ones of said compressed air load circuits.

2. The method according to claim 1, wherein said step of momentarily shutting off said compressed air load circuits is effected a predefined number of discrete times in succession.

3. The method according to claim 2, further comprising the steps of tracking said values and gradients while said compressed air load circuits are pulsed off, and shutting off ones of said compressed air load circuits when one of said values and gradients is below said respective threshold value, including after said step of momentarily shutting off said compressed air load circuits is effected a predefined number of discrete times in succession.

4. The method according to claim 1, further comprising the step of refilling non-defective and non-failed ones of said compressed air load circuits after said step of shutting off said at least one of defective and failed compressed air load circuit is effected.

5. The method according to claim 1, further comprising the step of canceling shutoff of non-defective and non-failed ones of said compressed air load circuits after shutoff of said at least one of a defective and failed ones of said compressed air load circuits.

6. The method according to claim 1, wherein said predefined respective threshold value corresponds to a variable of state to be adjusted in said compressed air load circuits.

7. A system for detecting a defect or failure of a compressed air load circuit in a vehicle, comprising a compressed air supply part and a compressed air consumer part, said compressed air supply part including a compressor, said compressed air consumer part including a plurality of compressed air load circuits, electrically actuatable valves for supplying compressed air to said compressed air load circuits, sensors for monitoring pressure in said compressed air load circuits, and an electronic control unit for evaluating electrical signals from said sensors and for controlling said electrically actuatable valves, wherein said electrically actuatable valves associated with said load circuits are all switchable momentarily by said control unit to a shut-off state for detecting at least one of a defect in and failure of one of said compressed air load circuits, and wherein said control unit is operable to compare at least one of measured values and determined gradients of a variable of state obtained during said shut-off state of said electrically actuatable valves with a predefined respective threshold value to identify at least one of said compressed air circuits having at least one of said values and gradients below said threshold value as at least one of a defective and failed compressed air load circuit, and to shut off said at least one of a defective and failed circuit.

8. The system according to claim 7, wherein electrically actuatable valves of non-defective and non-failed ones of said compressed air load circuits are switchable to an open normal state.

9. The system according to claim 7, wherein said control unit is adapted to effect shutoff phases by briefly pulsing said electrically actuatable valves of said compressed air load circuits to shut-off state multiple times in succession.

10. The system according to claim 9, wherein said control unit is adapted to determine said at least one of values and gradients during said shutoff phases and, after completion of a predefined number of shutoff phases, to detect ones of said compressed air load circuits having at least one of said values and gradients below said respective threshold value as at least one of defective and failed circuits.

11. The system according to claim 10, wherein said control unit is operable to switch electrically actuatable valves of non-defective and non-failed ones of said compressed air load circuits back to an open de-energized normal state.

12. The system according to claim 10, wherein said non-defective and non-failed ones of said compressed air load circuits are refilled after said electrically actuatable valves have been switched to an open de-energized normal state.

13. The system according to claim 7, wherein said threshold value corresponds to a value of said variable of state to be adjusted in said load circuit.

14. The system according to claim 7, wherein said electrically actuatable valves are solenoid valves.

* * * * *